United States Patent [19]

Wallace

[11] Patent Number: 5,071,287
[45] Date of Patent: Dec. 10, 1991

[54] OIL CONTAINMENT SYSTEM

[76] Inventor: Ian Wallace, 5402 Standing Oak Rd., Midlothian, Va. 23112

[21] Appl. No.: 496,779

[22] Filed: Mar. 21, 1990

[51] Int. Cl.⁵ .............................................. E02B 15/04
[52] U.S. Cl. ..................................... 405/68; 405/63; 405/66; 405/67
[58] Field of Search .................... 405/60, 63, 66–69, 405/72, 62; 210/242.3, 923

[56] References Cited

U.S. PATENT DOCUMENTS

| 3,503,214 | 3/1970 | Desty et al. | 405/68 |
|---|---|---|---|
| 3,563,036 | 2/1971 | Smith et al. | 405/69 |
| 3,665,713 | 5/1972 | Rath | 405/62 |
| 3,685,297 | 8/1972 | Juodis et al. | 405/68 |
| 3,798,911 | 3/1974 | Oberg | 405/69 |
| 4,089,178 | 5/1978 | Kinase et al. | 405/72 X |
| 4,123,911 | 11/1978 | Finigan et al. | 405/68 |
| 4,140,424 | 2/1979 | Bretherick et al. | 405/68 |
| 4,209,400 | 6/1980 | Mayes | 210/242.3 X |
| 4,249,834 | 2/1981 | Bouvier | 405/70 |
| 4,960,347 | 10/1990 | Strange | 405/63 |

FOREIGN PATENT DOCUMENTS

| 8001580 | 8/1980 | PCT Int'l Appl. | 405/66 |
|---|---|---|---|
| 189188 | 4/1964 | Sweden | 405/60 |

Primary Examiner—Randolph A. Reese
Assistant Examiner—John A. Ricci
Attorney, Agent, or Firm—Staas & Halsey

[57] ABSTRACT

An oil containment system includes an inflatable boom for encircling an oil containing vessel. A spreader runs parallel with the inflatable boom and is filled with pressurized water to cause the inflatable boom to assume a particular shape and position around the vessel.

15 Claims, 3 Drawing Sheets

OIL CONTAINMENT SYSTEM

BACKGROUND OF THE INVENTION

1. Field of the Invention

The present invention relates generally to oil containment systems and, more specifically, to an oil containment system deployable from an oil carrying vessel in the event of a leakage or rupture.

2. Description of the Related Art

Oil spills from oil tankers or other oil carrying vessels have catastrophic environmental effects. Oil spills have been known to create slicks measuring in the hundreds of square miles. While time is clearly of the essence when containing an oil spill, presently available technology does not facilitate rapid containment. Conventionally, floating booms are assembled at the periphery of the slick in an effort to prevent spreading. However, these booms are usually not brought into position until hours, sometimes days, after the event which lead to the spill. Thus, the effectiveness of conventional booms is severely limited. For vessels which are undergoing a loading or unloading operation, it is known to provide barriers, such as booms, which can be assembled around the vessel. One example is found in U.S. Pat. No. 3,146,598, issued to Smith, for an apparatus which is stored near a docking area, and deployed by a towing vessel. The floating boom is stored in a folded position and, when deployed, forms a continuous elongated flexible polymer fin made buoyant by a plurality of polymer floats. While this apparatus may be effective for containing an accidental spill, it must be deployed before an accidental spill occurs, such as when the vessel is docked. Therefore, the apparatus would provide no protection for a moving vessels which incurs a tank rupture while under way.

U.S. Pat. No. 3,973,406, issued to Casey, provides a containment boom which supports an upstanding curtain. This patent is similar to Smith in that it must be deployed while the ship is docked.

U.S. Pat. No. 3,766,739, issued to MacLean, describes another barrier which is deployed when a vessel is docked. The barrier is corrugated and retractable to fit against the docking side of the vessel.

U.S. Pat. No. 3,818,708 describes a permanent floating barrier which includes an upstanding curtain made buoyant by a float element.

U.S. Pat. No. 4,269,538, issued to Hauan, describes a barrier attached to the side of a ship. The barrier increases in height toward the side of the ship in order to form a barrier sail which extends from the height of the deck and down to the beginning of the bilge section at the side of the ship. The barrier is intended to act as a collector and as such is intended to direct oil towards a collection point.

A system which can be used to encircle a non-docked vessel is described in U.S. Pat. No. 4,249,834, issued to Bouvier. The system includes a boom which encircles the vessel and which is held at a distance from the vessel by rib members. Skirts hang downwardly from the boom to extend below the bottom of the vessel, and are weighted on the lower ends for stability.

While the structure described in U.S. Pat. No. 4,249,834 has the potential to be deployed immediately, there is very little description of how the boom is deployed. Moreover, the rib members cannot be assembled quickly enough to position the boom around the vessel.

SUMMARY OF THE INVENTION

An object of the present invention is to prevent oil spills from spreading and creating an environmental hazard.

Another object of the present invention is to provide an oil containment system which can be deployed immediately after an oil spill, thereby containing the slick to an area immediately around the vessel.

Another object of the present invention is to provide a deployment mechanism for an oil containment system to facilitate rapid deployment of a containment structure.

In order to attain these and other objects, the present invention provides an oil containment system for containing oil discharged from a water born structure, the system including an inflatable boom deployable to encircle the structure, a series of tether lines connecting the inflatable boom to the structure, a submersible curtain hanging downwardly from the inflatable boom after deployment, spreader means connected to the inflatable boom for spreading the inflatable boom after deployment to attain a desired disposition, storage means connected to the structure for storing the inflatable boom prior to deployment, and release means associated with the storage means for releasing the inflatable boom into a deployed position around the structure.

These and other features and advantages of the oil containment system of the present invention will become more apparent with reference to the following detailed description and drawings.

DETAILED DESCRIPTION OF THE PREFERRED EMBODIMENTS

Figure 1:
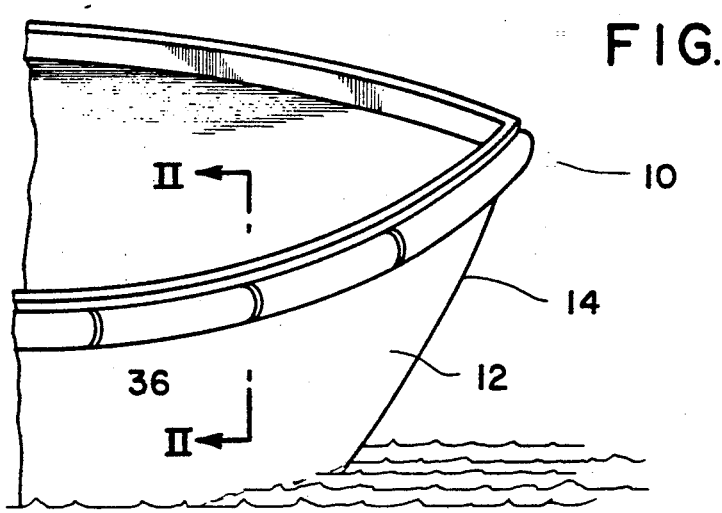
FIG. 1 is a perspective view showing a bow portion of an oil containing vessel, with the oil containment system of the present invention in the stowed position.

Referring to FIGS. 1-4, an oil containment system according to the present invention is generally referred to by the numeral 10, and is attached to the hull 12 of an oil containing vessel 14 completely around the deck so that when deployed, the system completely encircles the vessel. FIG. 1 shows only the bow portion of the vessel, and shows the system 10 connected to or near the rail just above the deck. However, it is sufficient to connect the system 10 to an upper part of the hull 12 of the vessel 14.

Figure 2:
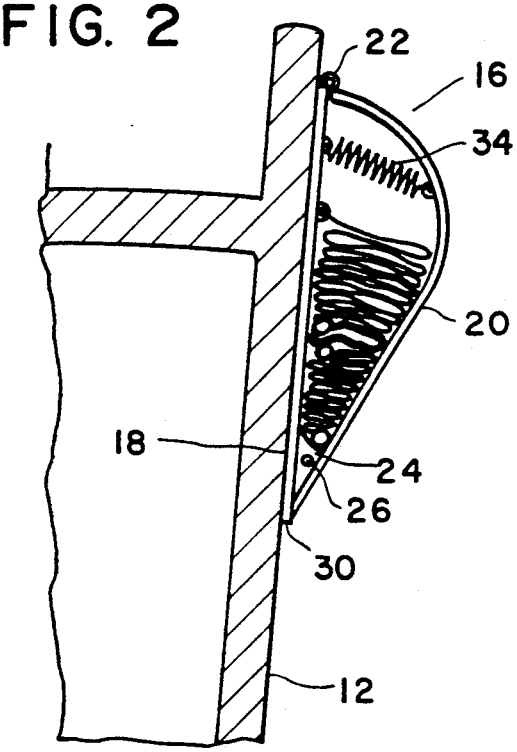
FIG. 2 is a cross-sectional view of the oil containment system taken along lines II—II of FIG. 1.

Referring to FIG. 2, the system includes a plurality of storage compartments 16 which collectively form storage means for the deployable portion of the system. The shape of the compartment 16 is bulbous at the upper portion and acutely angled at the lower portion, thus resembling a half-heart. The compartment 16 includes a backing plate 18 which can vary in length, depending on the size of the deployable components of the system stored within the compartment 16. Typically, each compartment is about twenty feet long, with a height of about five feet. Thus, the backing plate 18 has a length of about twenty feet and a height of about five feet.

A cover plate 20 is connected to the backing plate 18 by a hinge 22 which facilitates pivotal movement of the cover plate 20 outwardly away from the backing plate 18 to release the deployable components of the system. The backing plate 18 may be attached to the hull 12 of the vessel 14 by any suitable means, such as welding, riveting, threaded fasteners, etc.

A plurality of brackets 24 are welded or otherwise suitably attached to the backing plate 18 near the lower end thereof at preferably equidistantly spaced intervals. For example, in the embodiment in which the compartment is twenty feet long, there would be four brackets 24 spaced five feet apart. Each bracket has an upper surface angled at about forty-five degrees from the plane of the backing plate 18, and each bracket 24 has a hole 26 bored therethrough to support a release pin which, prior to deployment, passes through hole 26 of the bracket 24 and through a corresponding hole of a bracket 28 connected to the inside of the cover plate 20 opposing each of the brackets 24.

Figure 3A:
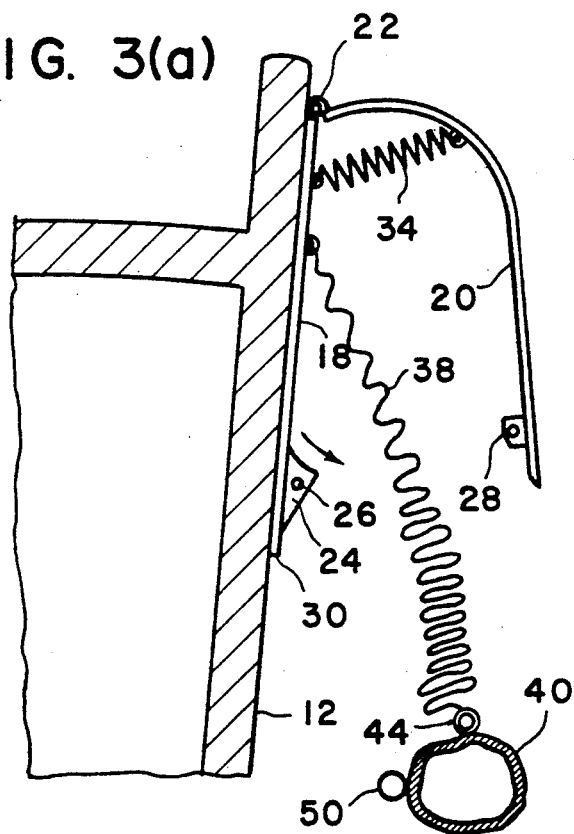
FIG. 3(a) is a view similar to FIG. 2, showing the oil containment system immediately after deployment.
Figure 3B:
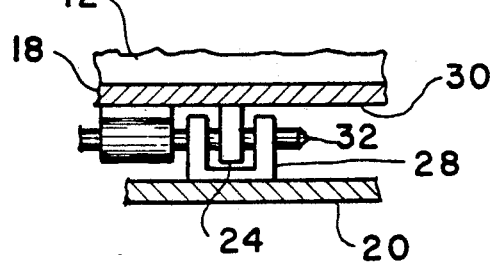
FIG. 3(b) is a cross-sectional view showing details of the release mechanism.

The pin is pulled out of the brackets 24 and 28 by pulling a release cable 30 which is slidably mounted in the brackets 24. An example of the release pin is shown in FIG. 3(b), in which the release cable 30 carries a release pin 32. When the cable 30 is pulled to the left as shown by the directional arrow, the pin 32 also moves to the left and is withdrawn from the holes provided in the bracket 28 and the bracket 24. The cable 30 extends around the vessel, so that by pulling the cable 30 with, for example, a winch, all of the release pins 32 will be released simultaneously so as to release the cover plate 20 from the lower end of the backing plate 18 for the plurality of compartments.

A gasket (not shown) may be placed between the bottom of the backing plate 18 and the bottom of the cover plate 20 to prevent water from entering the compartment. Each compartment does not have end walls, and, because each adjacent compartment is placed end-to-end, the plurality of compartments form a single, circumferentially disposed compartment.

Although the preferred embodiment has been described with a release cable and pin mechanism, it is also possible to provide other release means, such as solenoid actuated latch mechanisms which are electrically interconnected so that from a control panel, all solenoids could be operated simultaneously to release a plurality of latches disposed circumferentially around the vessel.

A spring actuator 34 is disposed in an upper portion of the compartment so that when the release mechanism is actuated, the cover plate 20 springs outwardly to provide an open bottom for the compartment from which the deployable components of the system are discharged.

Preferably, a gasket material which constitutes a flexible membrane is applied between the various compartments so as to prevent leakage of water into the compartments. Flexible membranes 36 are illustrated in FIG. 1 between the different compartments.

A rear portion of the vessel near the pump house would have a square section cut out of the hull and backing plate at the top center. Any flexible membrane applied near the hinge at this point would be cut away to receive a four inch round pipe with flanges for mounting same. This pipe connects to a four inch fire hose which would be stowed in the compartment adjacent the pump house. The pump house (illustrated in FIG. 4(a) and 4(b) will include a high pressure water pump which has an intake at the ship's water supply, and delivers pressurized water to the spreader (to be described below).

A floor plate (not shown) may be pivotally connected to the backing plate 18 approximately in line with the bracket 24. In the non-deployed position, the floor plate would be substantially horizontally disposed, and would have a distal end resting on the bracket 28. When the cover plate 20 pivots outwardly, the floor plate would be released and would pivot downwardly until it comes to rest on the brackets 24 at an angle. This will help cause the contents of the compartments to fall outwardly away from the vessel.

The contents of the compartments include coiled tether lines 38 which connect an inflatable boom 40 to the vessel 14 (at the cover plate 20). The inflatable boom 40 is deployable when the release mechanism causes cover plate 20 to open, thereby dumping the contents of the compartments.

A submersible curtain 42 hangs downwardly from the inflatable boom 40 after deployment. Prior to deployment, the curtain 42 is coiled inside the compartment, such as in an accordion fold.

A spreader 44 is connected to the inflatable boom 40, and provides means for spreading the inflatable boom after deployment to attain a desired disposition, in which the boom encircles the vessel. The spreader 44 is preferably a water hose which is connected to the line 46 emanating from the pump 48. The pump fills the hose or spreader 44 with pressurized water, thus in FIGS. 4(a) and 4(b).

Figure 4A:
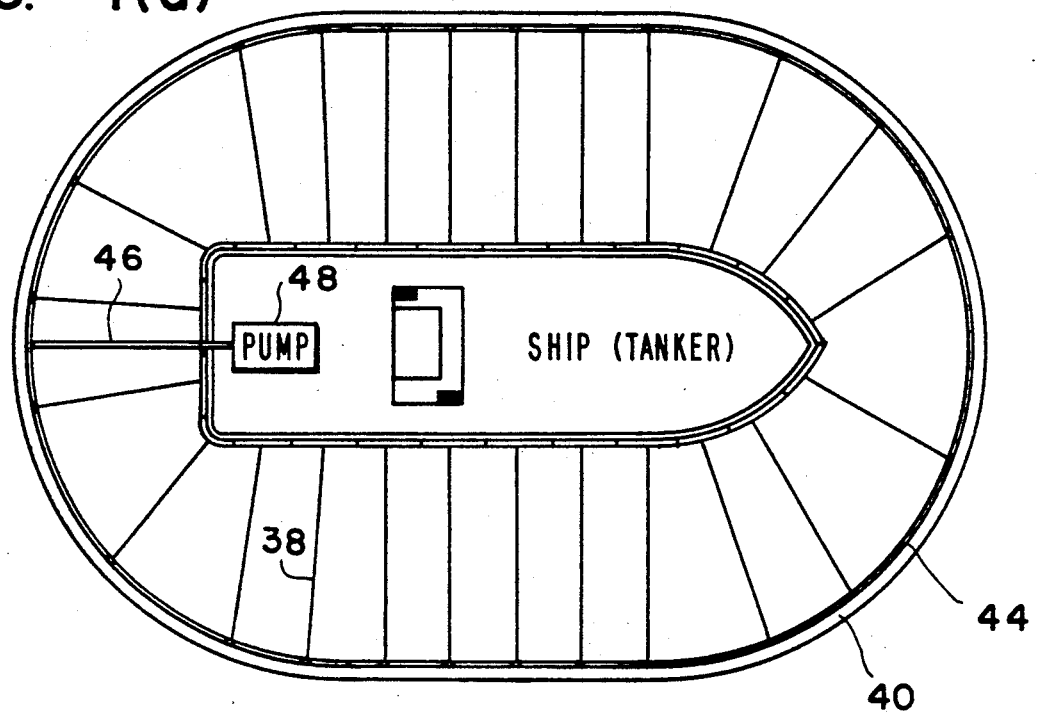
FIG. 4(a) is a top plan view of the vessel after deployment of the oil containment system according to the present invention.
Figure 4B:
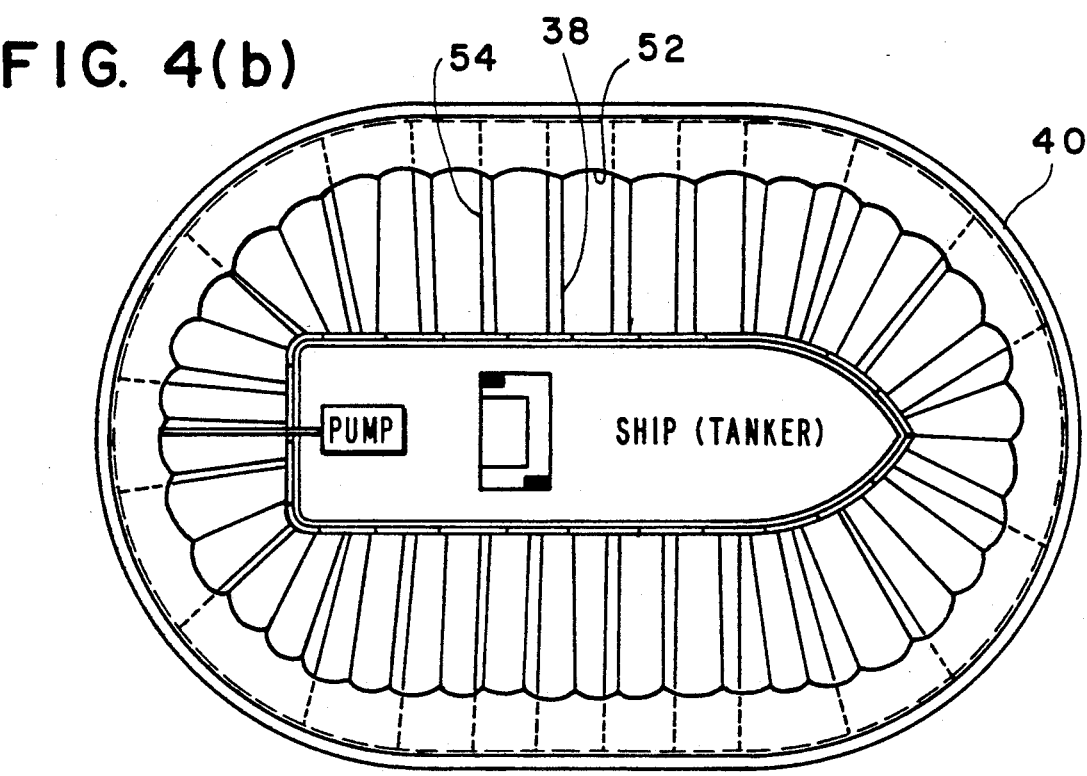
FIG. 4(b) is a top plan view of the oil containment system of the present invention, showing an optionally deployed canopy.

Although the inflatable boom 40 is illustrated in FIG. 4(a) and FIG. 4(b) to be a continuous structure, as previously mentioned, it may be formed by a plurality of segments.

The spreader 44 is a standard four inch high pressure fire hose which can be connected to the inflatable boom 40 by any suitable means. The line 46 which connects the spreader 44 to the pump 48 is preferably about seventy feet long (for the embodiment using dimensions described previously) At the end of the line 46 on the opposite end from the pump, a Y coupling will be provided so that water can fill the spreader 44 in both directions. Preferably, connections, and hose segments are assembled to form the spreader 44 which basically outlines the vessel and extends outwardly about 40 feet from the vessel in all directions. When filled with pressurized water, the entire assembly will be pushed outwardly to the desired position.

The inflatable boom has a size which will vary according to each individual application. Using the dimensions described above, twenty foot sections may be used. Each section is made of a urethane sprayed lightweight material, such as fabric, which is cut in desired lengths and widths. The material is reinforced and sewn together, after folding in half, so as to form a structure which is about eight feet in diameter. Each eight foot diameter section will have ends sewn thereto so as to provide a twenty foot long inflatable boom segment.

Straps are attached to the outside of each segment in order to fasten a high pressure cylinder or canister 50. This canister is packed under high pressure, and will be set off if a release pin is pulled from it. The release pin can be automatically pulled as the inflatable boom segment falls from the compartment. The canister 50 can be coupled to a standard inflation valve so that when the pin is pulled, the boom segment is inflated through a small tube connecting the canister 50 to the valve. This type of automatic inflation is generally known.

The curtain 42 is preferably about twelve feet wide, but the length of the fabric will vary according to each application. For example, a one hundred foot length of the curtain, which can be made of lightweight fabric, can be used and coupled to a plurality of inflatable boom segments or to a continuous boom. At the bottom end of the curtain 42, a ballast 51 is provided for stability. The ballast may be formed as a pocket in the fabric of the curtain by turning the end u and sewing it about twelve inches from the bottom, and then filling the pocket with sand. This would create a ballast of about thirty three pounds per linear foot.

As shown in FIG. 4(b), an optional foul weather canopy 52 may be disposed around the inflatable boom 40, and may be attached by guy wires 54. The canopy 52 keeps oil from spilling over the boom 40 when seas become rough. The canopy 52 may be attached after deployment so as to save space in the compartments.

If the canopy is attached to the inflatable boom prior to deployment, it is preferable to color code the guy wires 54 and tether lines 38 so that when stowed, the lines can be separated.

When packing the compartments, the sand-filled ballast 51 is placed first on the floor which extends substantially horizontally across the bottom of the compartment from just above the bracket 24 to the bracket 28. Then the curtain 42 is accordian folded or fan folded. Since the circumference of the inflatable boom 40 will exceed the circumference of the ship, packing must occur such that the additional length of the boom 40 is packed in the bow and stern portions of the vessel.

Figure 5:
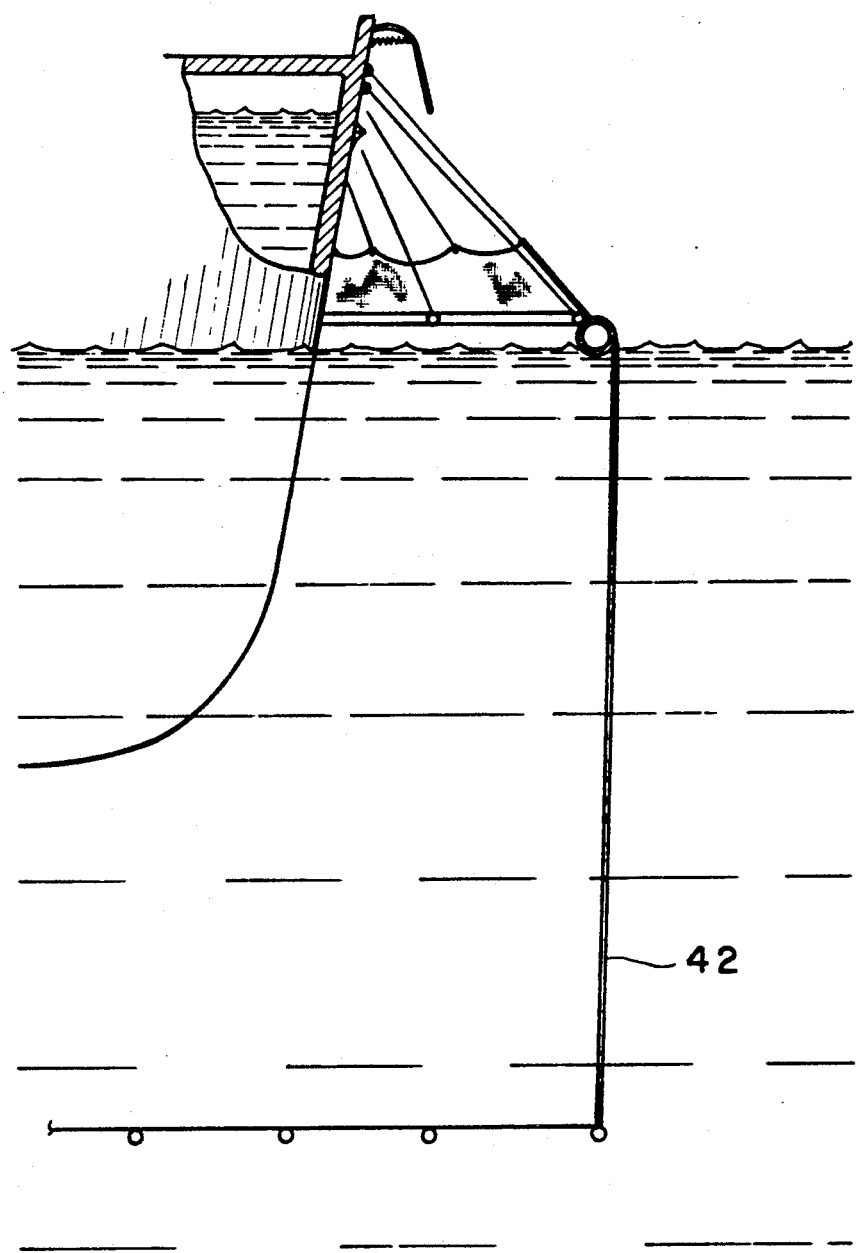
FIG. 5 is a schematic, sectional view showing the boom and curtain in deployed position.

Both the winch (not shown) which is used to pull the release cable 30 and the high pressure water pump 48 are connected to an electric timer (not shown). When the vessel develops a leak, a button on the main control panel is pressed and as a result the winch is started to pull the cable (which may be two cable segments). The cable segments pull the pins from the lower part of the compartment and, after pin release, the winch is shut off. The hinged floor falls about four inches and remains at an angle to help the contents of the compartments fall outwardly away from the vessel. The inflatable boom will start to be filled as soon as it is about four feet away from the storage compartment, and will be fully inflated in about five minutes. During inflation, the sand ballast 51 causes the curtain to be drawn downwardly. After about four minutes, the high pressure water pump begins to fill the spreader 44 with pressurized water, thus making the spreader 44 rigid, and pushing the floating boom out in all directions. As shown in FIG. 5 the curtain 42, when deployed, extending well beyond the bottom of the vessel, possibly up to fifty feet. Oil floating on the water between the vessel and the boom can then be syphoned off by another vessel.

Although the present invention has been described with respect to a vessel, such as an oil tanker, the system can be applied equally as well to an oil platform which is anchored to the sea bed. The platform would be rectangular in shape, and thus, only slight modifications would be required to the boom structure and spreader to provide ninety degree fittings so that boom segments and the spreader can form corners. However, the boom structure can be arranged in other shapes, and is not limited to the shape of the corresponding structure. For example, a rectangular platform could be provided with a circular boom structure.

Numerous modifications and adaptations of the present invention will be apparent to those so skilled in the art and thus, it is intended by the following claims to cover all such modifications and adaptations which fall within the true spirit and scope of the invention.

What is claimed is:

1. An oil containment system for containing oil discharged from a water born structure comprising:
   an inflatable boom depolyable to encircle the structure;
   a series of tether lines connecting the inflatable boom to the structure;
   a submersible curtain hanging downwardly from the inflatable boom after deployment;
   spreader means, connected to the inflatable boom, for spreading the inflatable boom after deployment to attain a desired disposition spaced outwardly from the structure;
   storage means, connected to an upper portion of the structure for storing the inflatable boom prior to deployment;
   release means associated with the storage means for releasing the inflatable boom into a deployed position around the structure; and
   wherein the storage means comprises a plurality of compartments, each having a backing plate and a cover plate pivotally connected to the backing plate at an upper end thereof, and release means releasably connecting a lower end of the backing plate to a lower end of the cover plate.

2. An oil containment system according to claim 1, further comprises spring means for spring biasing the cover plate outwardly away from the backing plate.

3. An oil containment system according to claim 2, wherein the spring means opens the cover plate automatically upon actuation of the release means.

4. An oil containment system according to claim 3, wherein the release means comprises a cable operatively connected to a release pin.

5. An oil containment system according to claim 1 further comprises a canopy connected to the inflatable boom at one end and to the structure at the other end by a plurality of lines.

6. An oil containment system according to claim 1, further comprising a ballast connected to a lower end of the curtain.

7. An oil containment system for containing oil discharged from a water-borne structure comprising;
   an annular inflatable boom deployable to encircle the structure;
   a series of tether lines connecting the inflatable boom to the structure;
   a submersible curtain hanging downwardly from the inflatable boom after deployment;
   a closed-loop, water-pressurized annular spreader, connected to the inflatable boom, for spreading the inflatable boom after deployment to attain a desired disposition spaced outwardly from the structure;

a compartment, connected to an upper portion of the structure, for storing the inflatable boom prior to deployment; and release means associated with the compartment for releasing the inflatable boom from the compartment into a deployed position around the structure, wherein the spreader comprises a hose connected to the inflatable boom between the water-borne structure and a vertical plane of symmetry of the inflatable boom after inflation of the boom, the hose having a small diameter compared to the boom and being connected to a source of pressurized water which is used to fill the hose after deployment of the inflatable boom.

8. An oil containment system for containing oil discharged from a water-borne structure comprising;

an annular inflatable boom deployable to encircle the structure;

a series of tether lines connecting the inflatable boom to the structure;

a submersible curtain hanging downwardly from the inflatable boom after deployment;

a closed-loop annular spreader, connected to the inflatable boom, for spreading the inflatable boom after deployment to attain a desired disposition spaced outwardly from the structure;

a compartment, connected to an upper portion of the structure for storing the inflatable boom prior to deployment and release means associated with the compartment for releasing the inflatable boom from the compartment into a deployed position around the structure, wherein the spreader comprises a hose connected to the inflatable boom between the water-borne structure and a vertical plane of symmetry of the inflatable boom after inflation of the boom, the hose having a small diameter compared to the boom and being connected to a source of pressurized fluid which is used to fill the hose after deployment of the inflatable boom.

9. An oil containment system according to claim 8, wherein the inflatable boom comprises a plurality of inflatable boom segments, each having a canister of pressurized gas which inflates each corresponding boom segment automatically when the inflatable boom segment is released from the storage means.

10. An oil containment system according to claim 8, wherein the compartment comprises a plurality of subcompartments, each having a backing plate and a cover plate pivotally connected to the backing plate at an upper end thereof, and release means releasably connecting a lower end of the backing plate to a lower end of the cover plate.

11. An oil containment system according to claim 10, further comprises spring means for spring biasing the cover plate outwardly away from the backing plate.

12. An oil containment system according to claim 11, wherein the spring means opens the cover plate automatically upon actuation of the release means.

13. An oil containment system according to claim 12, wherein the release means comprises a cable operatively connected to a release pin.

14. An oil containment system according to claim 8, further comprises a canopy connected to the inflatable boom at one end and to the structure at the other end by a plurality of lines.

15. An oil containment system according to claim 8, further comprising a ballast connected to a lower end of the curtain.

* * * * *